(12) United States Patent
Yano

(10) Patent No.: US 7,705,561 B2
(45) Date of Patent: Apr. 27, 2010

(54) CAR POWER SOURCE APPARATUS

(75) Inventor: Jyunya Yano, Kasai (JP)

(73) Assignee: Sanyo Electric Co., Ltd., Osaka (JP)

(*) Notice: Subject to any disclaimer, the term of this patent is extended or adjusted under 35 U.S.C. 154(b) by 552 days.

(21) Appl. No.: 11/812,612

(22) Filed: Jun. 20, 2007

(65) Prior Publication Data

US 2008/0007204 A1 Jan. 10, 2008

(30) Foreign Application Priority Data

Jun. 23, 2006 (JP) ............................. 2006-173672

(51) Int. Cl.
*H02J 7/00* (2006.01)

(52) U.S. Cl. .................... 320/118; 320/104; 324/434; 702/63

(58) Field of Classification Search ............... 320/118, 320/104; 702/63; 324/434
See application file for complete search history.

(56) References Cited

U.S. PATENT DOCUMENTS 5,701,068 A * 12/1997 Baer et al. .................. 320/119
6,392,384 B1 * 5/2002 Bo et al. ..................... 320/116
6,462,510 B1 * 10/2002 Takada et al. ............... 320/116
2002/0074971 A1 * 6/2002 Hidaka et al. ............... 320/120
2005/0093514 A1 * 5/2005 Shimizu ..................... 320/116

FOREIGN PATENT DOCUMENTS

JP 2002-199510 7/2002

* cited by examiner

*Primary Examiner*—Edward Tso
*Assistant Examiner*—Samuel Berhanu
(74) *Attorney, Agent, or Firm*—Wenderoth, Lind & Ponack, L.L.P.

(57) ABSTRACT

The voltage detection circuit 3 is provided with an isolation transformer 4 having its primary side connected to battery 2 connection nodes 10, a switching device 5 connected to the primary side of the isolation transformer 4, an isolated input circuit 7 that switches the switching device 5 ON and OFF, and a secondary voltage detection section 8 that detects output voltage from the secondary side of the isolation transformer 4. In the voltage detection circuit 3, the series input circuit 6 of the isolation transformer 4 primary side and the switching device 5 are connected to battery 2 measurement nodes, the switching device 5 is switched ON and OFF with a given periodicity by the isolated input circuit 7, and the output voltage from the secondary side of the isolation transformer 4 is detected by the secondary voltage detection section 8 to determine the voltage across the measurement nodes.

12 Claims, 3 Drawing Sheets

CAR POWER SOURCE APPARATUS

BACKGROUND OF THE INVENTION

1. Field of the Invention

This invention relates to a car power source apparatus that is provided with a circuit to detect battery voltage of a plurality of series-connected batteries in a battery array.

2. Description of the Related Art

For an on-board power source apparatus that drives a car, it is necessary to raise output voltage to increase output power. This is because output power is proportional to the product of battery voltage and current. For example, output voltage for a power source apparatus that drives a hybrid car or electric automobile is extremely high at 200V or more. A high voltage power source apparatus has many rechargeable batteries connected in series to form a battery array.

In a battery array with many batteries connected in series, it is important to charge and discharge those batteries while preventing over-charge and over-discharge of each battery. This is because over-charge and over-discharge degrade battery electrical performance as well as shorten battery lifetime. A power source apparatus that detects battery voltage and controls battery charging and discharging to prevent over-charge and over-discharge has been developed (refer to Japanese Patent Application Disclosure 2002-199510).

SUMMARY OF THE INVENTION

In the power source apparatus of the patent reference above, a voltage detection circuit detects the voltage of each battery. This power source apparatus can prevent over-charge and over-discharge by charging and discharging in a manner that limits battery voltage to a given range. This is because over-charge occurs when a battery is charged until a high voltage is reached and over-discharge occurs when a battery is discharged until a low voltage is reached. The voltage detection circuit inputs the voltage of each battery to a difference amplifier. Difference amplifier output is converted to a digital signal by an analog-to-digital (A/D) converter allowing battery voltage detection from that digital signal.

Since the ground line of this voltage detection circuit connects to some point in the battery array, it cannot output a voltage signal that is isolated from the battery array. If the output of the voltage detection circuit, which is connected to the battery array ground line, is connected to the charging and discharging control circuit for the battery array, the battery array will be connected to the chassis of the car. This is because the ground line of the charging and discharging control circuit is connected to the chassis of the car. The charging and discharging control circuit uses the 12V lead-storage battery that is mounted in the car as its power supply. The on-board lead-storage battery has its negative side, which is its ground line, connected to the chassis. As a result, a voltage detection circuit that cannot output a voltage signal isolated from the battery array ends up connecting the battery array to the car chassis.

Since a battery array that drives a car has considerably high voltage at 200V or more, safety can be improved by isolating the battery array ground line from the car chassis. In a voltage detection circuit not isolated from the battery array ground line, a voltage signal that is converted to a digital signal by an A/D converter can be isolated from the ground line, for example, by using a photo-coupler. However, this technique has the drawback that circuit complexity becomes significant. In addition, since a photo-coupler depends on a photo-sensor receiving light from a light emitting diode (LED) to transmit a voltage signal, it becomes impossible to transmit a stable output signal if any dirt, grime, or debris blocks the light path. Because a car power source apparatus is used in a harsh external environment in terms of dirt and grime, it is difficult for a photo-coupler to transmit a stable signal over the long term.

Further, in the power source apparatus of the patent reference above, the voltage of each battery is input to a difference amplifier to measure that voltage. Although the voltage across the input terminals of each difference amplifier is approximately constant and equal to the voltage of each battery, difference amplifier input terminal voltage with respect to the ground line gradually increases. As a result, difference amplifier input terminal pair bias voltage shifts to higher voltages. This is because each difference amplifier detects the voltage of a series connected battery and the voltage of each battery gradually increases with the number of batteries connected in series. This has the drawback that a difference amplifier adopted for use with this architecture must be an expensive high supply voltage device. In addition, since difference amplifier supply voltage must shift in with respect to the ground line just as input terminal voltage shifts, the power supply circuit becomes complex and expensive.

The present invention was developed to resolve these drawbacks. Thus it is an important object of the present invention to provide a car power source apparatus comprising a voltage detection circuit that can output a battery voltage signal isolated from the ground line of the battery array, and can output a stable battery voltage signal over long periods while having a simple, low cost circuit structure.

The car power source apparatus of the present invention is provided with the following structure to achieve the above-mentioned object. The car power source apparatus is provided with a battery array 1 having a plurality of batteries 2 connected in series, and a voltage detection circuit 3 to detect the voltage of the batteries 2 that make up the battery array 1. The voltage detection circuit 3 is provided with an isolation transformer 4 with its primary side connected to battery 2 connection nodes 10, a switching device 5 connected in series with the primary side of the isolation transformer 4, an isolated input circuit 7 that switches the switching device 5 ON and OFF with a given periodicity, and a secondary voltage detection section 8 that detects output voltage from the secondary side of the isolation transformer 4 which results from switching the switching device 5 ON and OFF via the isolated input circuit 7. The voltage detection circuit 3 electrically connects the primary side of the isolation transformer 4 and the switching device 5 series input circuit 6 to a pair of measurement nodes for battery voltage measurement. The switching device 5 is switched ON and OFF with a given periodicity via the isolated input circuit 7 and a voltage corresponding to the primary side input voltage is output at the secondary side of the isolation transformer 4. Output voltage at the secondary side of the isolation transformer 4 is detected by the secondary voltage detection section 8 to measure battery array 1 voltage at one pair of measurement nodes.

The power source apparatus above can output a battery voltage signal that is isolated from the battery array ground line while having a simple circuit structure. This is because the power source apparatus of the present invention connects battery measurement nodes to the isolation transformer and the switching device and its series input circuit, switches the switching device ON and OFF with a given periodicity, and detects isolation transformer output to measure battery voltage at the secondary side via the secondary voltage detection section. This type of voltage detection circuit can be manufactured at low cost due to its simple circuit structure. Since the isolation transformer eliminates any shift to higher voltages at the input side of the secondary voltage detection section, there is no need to increase secondary voltage detection section power supply voltage even though measurement node voltage may shift with respect to the reference node. Furthermore, there is no need to shift supply voltage and circuit structure of the secondary voltage detection section and the power supply can be simple allowing lower manufacturing cost.

In addition, since the isolation transformer primary to secondary voltage ratio can be changed by changing the primary to secondary winding ratio, not only can the voltage of each battery be detected by the secondary voltage detection section, but the high voltage overall battery array voltage can also be dropped in voltage and detected by the secondary voltage detection section.

Further, the power source apparatus described above has the characteristic that battery voltage can be accurately detected in a stable fashion over long periods even when used in a harsh grimy environment with considerable dirt and dust typical for a car. This is because unlike a photo-coupler that depends on light for signal transmission, the isolation transformer outputs battery voltage at its secondary side with a voltage ratio that is set by the primary to secondary winding ratio.

In the car power source apparatus of the present invention, the connection nodes 10 of a plurality of batteries 2 can be connected to the primary side of the isolation transformer 4 via input switches 9. Further, the input switches 9 can take both sides of each battery 2 as measurement nodes and sequentially connect them to the series input circuit 6 to detect the voltage of each battery 2.

Since the primary side of the isolation transformer is connected by input switches to the connection nodes of a plurality of batteries, input switch connections can be controlled to detect the voltage at any arbitrary measurement nodes.

In the car power source apparatus of the present invention, the isolated input circuit 7 can be provided with an input transformer 17 having its secondary connected to the input side of the switching device 5, and a pulse circuit 18 to input an ON-OFF pulse of given periodicity to the primary side of that input transformer 17. In this power source apparatus, the pulse circuit 18 inputs an ON-OFF pulse to the primary side of the input transformer 17 enabling the switching device 5 connected to the secondary side to switch ON and OFF with a given periodicity.

The secondary voltage detection section of the car power source apparatus of the present invention can include an A/D converter to convert output voltage to a digital signal in a manner synchronous with the ON-OFF period of the switching device 5.

The above and further objects of the invention as well as features thereof will become more apparent from the following detailed description to be made in conjunction with the accompanying drawings.

DETAILED DESCRIPTION OF THE PREFERRED EMBODIMENT(S)

Figure 1:
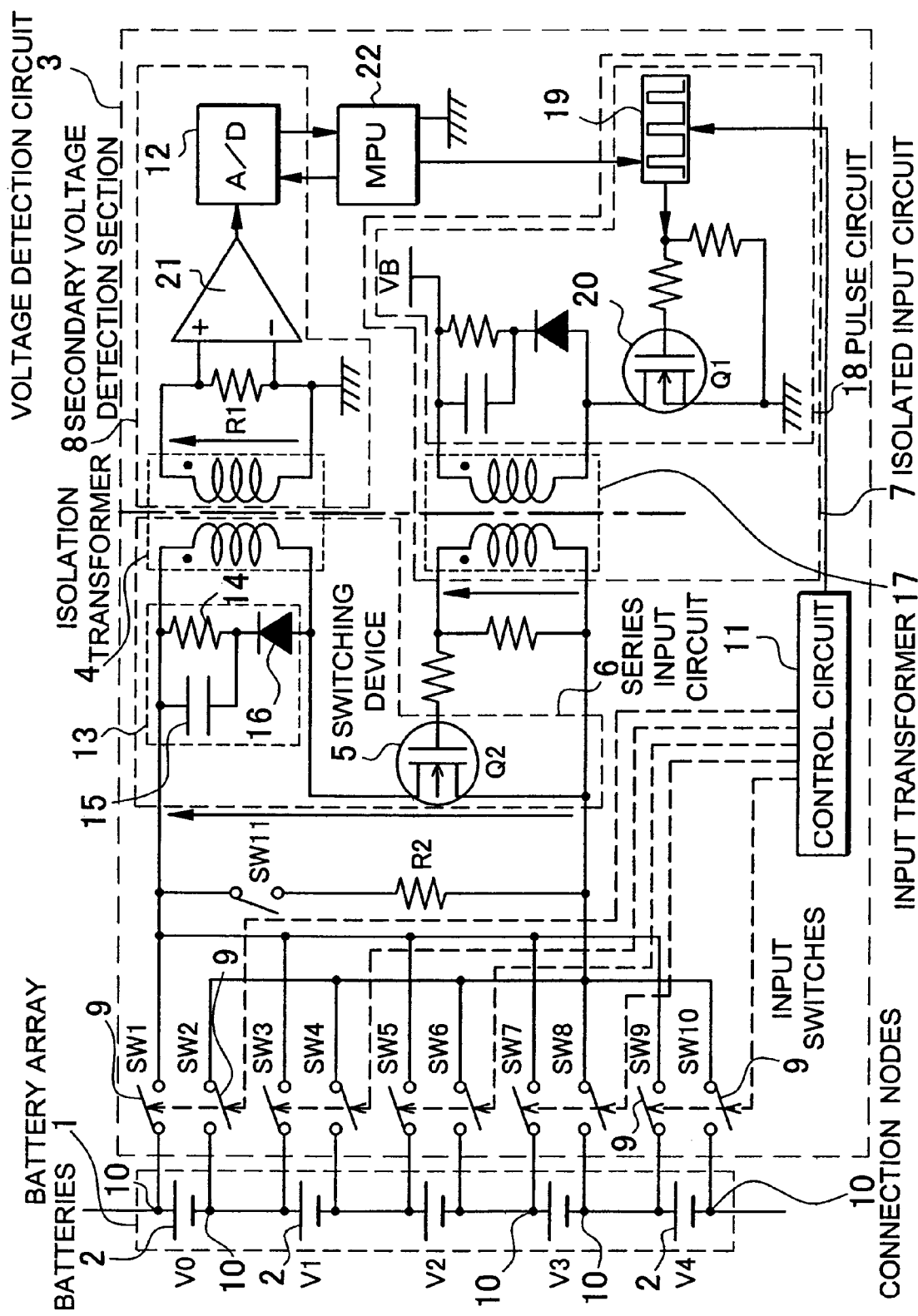
FIG. 1 is a circuit diagram of the car power source apparatus of an embodiment of the present invention.

The car power source apparatus of FIG. 1 is provided with a battery array 1 having a plurality of batteries 2 connected in series, and a voltage detection circuit 3 to detect the voltage of the batteries 2 that make up the battery array 1.

The voltage detection circuit 3 is included in the power source apparatus to detect the voltage of each battery 2 or the voltage at specific measurement nodes (for example, total battery array voltage), and prevent battery 2 over-charge and over-discharge during charging and discharging. The power source apparatus of the figures detects the voltage at the connection nodes 10 of each battery 2 to determine battery 2 voltage. The voltage detection circuit 3 can detect the voltage at the connection nodes 10 of all the batteries 2 to determine the voltages of all the batteries 2. However, the voltage detection circuit does not necessarily have to detect the voltage at all battery connection nodes. A plurality of series connected batteries can make up a battery unit, and the voltage detection circuit can detect the voltage at battery unit connection nodes to determine the voltages of individual battery units. For example, in an array of 50 series connected batteries, ideally the voltages of all 50 batteries would be independently detected by the voltage detection circuit. Another option could take two batteries as one battery unit, and detect the voltages of all the two-battery units. Further, the voltage detection circuit can also detect the voltage across connection nodes at the positive and negative ends of the battery array to determine the total battery array voltage.

The batteries 2 of the battery array 1 are lithium ion rechargeable batteries or nickel hydrogen batteries. In a power source apparatus with a plurality of lithium ion batteries, the voltages of all the batteries are detected and charging and discharging of each battery is controlled. In a power source apparatus with nickel hydrogen batteries, a plurality of nickel hydrogen batteries are connected in series to form a battery module, and voltage is detected for battery module units. For example, in a power source apparatus with nickel hydrogen batteries, 5 nickel hydrogen batteries are connected in series to form a battery module, next 50 battery modules are connected in series to form the battery array. This battery array has a total of 250 nickel hydrogen batteries connected in series and has an output voltage of 300V. However, a nickel hydrogen battery module does not necessarily have to have 5 batteries connected in series, and it may have 4 rechargeable batteries or less or 6 rechargeable batteries or more connected in series. The battery array also does not necessarily have to have 50 battery modules connected in series, and it may have more or fewer series connected battery modules. Further, any battery that can be recharged, such as a nickel cadmium battery, can also be used as batteries in the power source apparatus.

Detected battery 2 voltage is used to determine remaining battery 2 capacity or to correct remaining battery capacity calculated by integrating charging and discharging current. It is also used to detect complete discharge when remaining battery capacity becomes zero and to cutoff discharging current in an over-discharge condition. Further, it is used to detect full charge and to cutoff charging current in an over-charge condition.

A battery array 1 having many batteries 2 connected in series charges and discharges all batteries 2 with the same current. Therefore, the charge capacity and discharge capacity of all batteries 2 becomes the same. However, the electrical characteristics of all batteries 2 do not all change together in an equal fashion. In particular, as the number of charge-discharge cycles increases, the degree of degradation of each battery 2 becomes different, and capacity obtainable at full charge changes. In this state, a battery 2 with reduced full charge capacity becomes easily over-charged and easily over-discharged. Since battery electrical characteristics degrade markedly with over-charge and over-discharge, a battery 2 with reduced full charge capacity degrades radically as it is over-charged or over-discharged. As a result, in a battery array 1 that is a series connection of many batteries 2, it is important to charge and discharge batteries 2 while preventing over-charge and over-discharge of all the batteries 2. Namely, it is important to charge and discharge batteries 2 while protecting all the batteries 2. The voltage detection circuit 3 detects battery 2 voltage to protect all the batteries 2 while charging and discharging.

The voltage detection circuit 3 is provided with an isolation transformer 4 with its primary side connected to battery 2 connection nodes 10 via input switches 9, a switching device 5 connected in series with the primary side of the isolation transformer 4, an isolated input circuit 7 that switches the switching device 5 ON and OFF with a given periodicity, and a secondary voltage detection section 8 that detects output voltage from the secondary side of the isolation transformer 4 which results from switching the switching device 5 ON and OFF via the isolated input circuit 7.

In the voltage detection circuit 3, battery 2 voltage is input to the primary side of the isolation transformer 4 and the switching device 5 series input circuit 6. Direct current (DC) applied to the input circuit 6 is converted to square-wave alternating current (AC) by ON-OFF switching of the switching device 5, and is output from the primary to the secondary of the isolation transformer 4 as a square-wave. The ON-OFF switching frequency of the switching device 5 is selected above audible frequencies to avoid generating audible noise, and for example, is selected above 20KHz, and preferably is selected between 20KHz and 1 MHz.

The input switches 9 input the potential at each connection node 10, which is a measurement node, to the series input circuit 6. The input switches 9 are sequentially switched to input the voltage of each battery 2 to the series input circuit 6 consecutively and at a constant periodic rate. In the voltage detection circuit 3 of the figures, the positive side input terminal of the series input circuit 6 is connected via the input switches 9 to the positive side measurement nodes of all the batteries 2. Meanwhile, the negative side input terminal of the series input circuit 6 is connected via the input switches 9 to the negative side measurement nodes of all the batteries 2. The pair of input switches 9 connected to the positive and negative sides of a battery 2 to be measured are simultaneously switched ON to input the voltage of that battery 2 to the series input circuit 6. The input switches 9 input the voltage of one battery to the series input circuit 6, and do not input the voltage of any other batteries. Consequently, when one pair of input switches 9 connected to the positive and negative sides of one battery 2 are switched ON, all other input switches 9 are switched OFF. Pairs of input switches 9 are sequentially switched to input all battery voltages to the series input circuit 6 and consecutively detect the voltages of the batteries 2. The input switches 9 are controlled ON and OFF by the control circuit 11.

The voltage detection circuit 3 of the figures has a structure that sequentially switches input switch 9 pairs to consecutively detect the voltage of each battery 2. However, the voltage detection circuit 3 does not necessarily have to simultaneously switch pairs of input switches ON and OFF and detect the voltage of each battery. The voltage detection circuit, which has a structure that allows a plurality of input switches to be individually switched ON or OFF, can also measure the voltage at any arbitrary measurement nodes. For example in FIG. 1, the input switches connected to connection nodes at the positive and negative ends of the battery array (SW1 and SW10) can be switched ON and all other input switches (SW2 through SW9) can be switched OFF to detect the total voltage of the battery array. Similarly, a particular pair of switches can be turned ON and all other switches can be turned OFF to detect the voltage at any arbitrary measurement nodes. For example, to detect the combined voltage of two batteries, input switches connected to the connection nodes on the positive and negative sides of the two batteries are switched ON and all other input switches are switched OFF.

The voltage detection circuit described above connects the connection nodes 10 of a plurality of batteries 2 to the isolation transformer 4 and switching device 5 series input circuit 6 via input switches 9. This voltage detection circuit 3 can control input switch 9 connection states to detect the voltage of each battery 2 or the voltage at arbitrary measurement nodes. However, in a voltage detection circuit that detects only the voltage at a particular pair of measurement nodes, it is not always necessary to provide input switches, and the measurement nodes for voltage detection can be hard-wired directly to the series input circuit. For example, in a voltage detection circuit that detects only the total voltage of the battery array, connection nodes at the positive and negative ends of the battery array can be connected to the series input circuit to detect the voltage across those measurement nodes and determine the total voltage of the battery array.

The primary and secondary sides of the isolation transformer 4 are electrically isolated. The isolation transformer 4 has a characteristic frequency response (frequency domain characteristic) for transmission of a square-wave from its primary to secondary. The ratio of input voltage at the primary side with respect to output voltage at the secondary side is set by the winding ratio of the isolation transformer 4. The winding ratio of the isolation transformer 4 is set by the ratio that allows the maximum primary side input voltage to be converted to the maximum voltage that can be detected by the secondary voltage detection section 8. For example, if the voltage detection circuit 3 measures the total battery array 1 voltage and the maximum output voltage of the battery array 1 is 300V, the maximum primary side input voltage becomes 300V. Further, if the secondary voltage detection section 8 supply voltage is 12V and a maximum of 10V can be detected, the winding ratio of the isolation transformer 4 is made 30:1. The output voltage of the secondary side of the isolation transformer 4 can be reduced by increasing the winding ratio of the primary with respect to the secondary.

Output voltage at the secondary side of the isolation transformer 4 is input to the secondary voltage detection section 8. The secondary voltage detection section 8 is provided with an A/D converter 12 to convert the analog signal input to the secondary voltage detection section 8 to a digital signal. The resolution of the A/D converter 12 is determined by the number of bits. For example, a 16-bit A/D converter can detect to a resolution of approximately 4.5 mV for 300V input to the primary side. For a given transformer winding ratio, A/D converter resolution is independent of input voltage magnitude. Therefore, for detection of the voltage of a single battery (for example, 3V to 4V) with the winding ratio above, battery voltage cannot be resolved below 4.5 mV. Consequently, for a lithium ion rechargeable battery with battery voltage that varies between 3V and 4V, a 16-bit A/D converter can detect voltage in that range to a resolution of 4.5 mV. The secondary voltage detection section can detect battery voltage even more accurately by using a higher resolution A/D converter. In the case where high resolution is not required, an A/D converter with less than 16-bits can be used to convert battery voltage to a digital signal.

In the case where the voltage detection circuit 3 detects only the voltage of individual batteries and not the total voltage of the battery array 1, the isolation transformer 4 winding ratio can be made smaller. This is because the maximum input voltage to the primary side of the isolation transformer 4 is reduced. For example, if the maximum primary side input voltage is 5V and the maximum voltage of the secondary voltage detection section is 5V, isolation transformer winding ratio becomes 1:1. Since the secondary voltage detection section converts the 5V analog signal to a digital signal, a 20 mV resolution can be obtained with an 8-bit A/D converter. As a result, a secondary voltage detection section that detects only the voltage of individual batteries and not total voltage can accurately detect battery voltage using an inexpensive A/D converter with a smaller number of bits. A secondary voltage detection section that only detects the voltage of individual batteries can measure the voltage of all batteries and add those voltages to determine the total battery array voltage. Further, if the maximum secondary voltage detection section voltage is 4V, the isolation transformer winding ratio can be made 5:4 to output 4V at the secondary when 5V is input to the primary.

The isolation transformer 4 of the figures has a ringing prevention circuit 13, which is a parallel connection of a resistor 14 and capacitor 15 in series with a diode 16, connected in parallel with its primary side. The ringing prevention circuit 13 absorbs high voltage induced at the primary side when the switching device 5 switches OFF and prevents distortion of the square-wave.

The switching device 5 is a semiconductor switch such as a field effect transistor (FET) that is switched ON and OFF by a square-wave input to its gate. A bipolar transistor can also be used instead of a FET as the switching device 5.

The switching device 5 is switched ON and OFF by the isolated input circuit 7. The isolated input circuit 7 of FIG. 1 is provided with an input transformer 17 with its secondary side connected to the input side of the switching device 5, namely to the gate of the switching device 5, and a pulse circuit 18 to input an ON-OFF pulse of given periodicity to the primary side of the input transformer 17. The pulse circuit 18 is provided with a pulse generator section 19 and a FET semiconductor switch 20 that is switched ON and OFF by the square-wave output from the pulse generator section 19. The input transformer 17 isolates the pulse generator section 19 from the switching device 5 and switches the switching device 5 ON and OFF with a given periodicity. Consequently, The isolated input circuit 7 switches the switching device 5 ON and OFF while isolating the pulse generator section 19 from the switching device 5. Specifically, there is no ground line connected between the pulse generator section 19 and the switching device 5.

This isolated input circuit 7 switches the switching device 5 ON and OFF by the following operation. The pulse generator section 19 inputs an ON-OFF pulse to the gate of the FET semiconductor switch 20 to switch the FET ON and OFF. When the semiconductor switch 20 is switched ON and OFF, a square-wave is supplied to the primary side of the input transformer 17. Since one side of the input transformer 17 primary is connected to a positive supply voltage (5V to 12V) and the other side is connected to the semiconductor switch 20, a square-wave is input to the primary when the semiconductor switch 20 is switched ON and OFF. When a square-wave is input to the primary side of the input transformer 17, a square-wave is also output from the secondary side. This secondary side square-wave is input to the gate of the switching device 5 to switch the switching device 5 ON and OFF. The square-wave output from the secondary side of the input transformer 17 is output that can switch the switching device 5 ON and OFF (considering its threshold voltage). Therefore, this isolated input circuit 7 switches the switching device 5 ON and OFF via a square-wave output from the pulse generator section 19.

Figure 2:
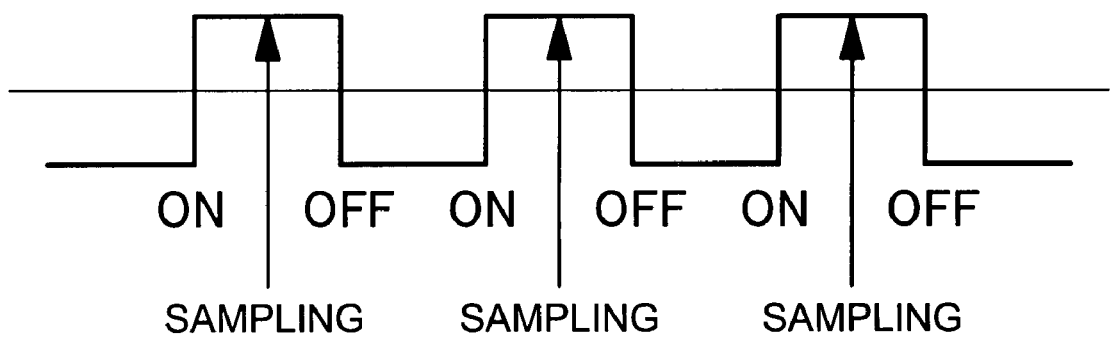
FIG. 2 is a timing diagram for conversion of input amplifier output to a digital signal by the A/D converter.

The switching device 5 is switched ON and OFF, and a square-wave corresponding to battery 2 voltage is output from the secondary side of the isolation transformer 4 and input to the secondary voltage detection section 8. The secondary voltage detection section 8 is provided with an input amplifier 21 connected to the secondary side of the isolation transformer 4, and an A/D converter 12 connected to the output side of the input amplifier 21. The A/D converter 12 is synchronized with square-wave output from the pulse generator section 19, and converts input amplifier 21 output to a digital signal. FIG. 2 shows the timing for digital conversion by the A/D converter 12, which is synchronous with the square-wave output from the secondary side of the isolation transformer 4. As shown in FIG. 2, the A/D converter 12 converts voltage output from the input amplifier 21 to a digital signal during flat parts of the square-wave, that is between points where the switching device 5 is switching ON or OFF. The voltage detection circuit 3 of FIG. 1 is provided with a microprocessor unit (MPU) 22 that outputs a trigger pulse to set the timing for A/D converter 12 sampling and digital conversion of input amplifier 21 output. This MPU 22 also outputs a synchronizing signal to the pulse generator section 19. The pulse generator section 19 outputs a square-wave synchronized with the synchronizing signal input from the MPU 22.

In the voltage detection circuit 3 described above, the pulse generator section 19 outputs a square-wave, which is synchronized with the synchronizing signal output from the MPU 22, to the FET semiconductor switch 20. The FET semiconductor switch 20 is switched ON and OFF by the square-wave. Specifically, the FET semiconductor switch 20 is switched ON when the square-wave is HIGH and is switched OFF when the square-wave is LOW. The FET semiconductor switch 20 is switched ON and OFF and a square-wave is supplied to the primary side of the input transformer 17. The primary and secondary sides of the input transformer 17 are isolated and a square-wave is output from the secondary side. The secondary side square-wave is input to the gate of the FET switching device 5 to switch the switching device 5 ON and OFF. When the switching device 5 is switched ON and OFF, battery voltage input to the series input circuit 6 is input as AC to the primary side of the isolation transformer 4. Here, a pair of input switches 9 are turned ON to input battery voltage to the series input circuit 6. DC battery voltage input to the series input circuit 6 is converted to a square-wave at the primary side of the isolation transformer 4 and output at the secondary side. The square-wave output at the secondary side of the isolation transformer 4 is shown in FIG. 2. The secondary voltage detection section 8 A/D converter 12, which is synchronized to the square-wave, converts the voltage in flat parts of the square-wave to a digital signal. This output digital signal represents the battery voltage input to the isolation transformer 4 series input circuit 6. After a given battery voltage is detected, the pair of input switches 9 connected to the series input circuit 6 is switched and sequentially the voltages of the next batteries are detected by repeating the same operations.

Figure 3:
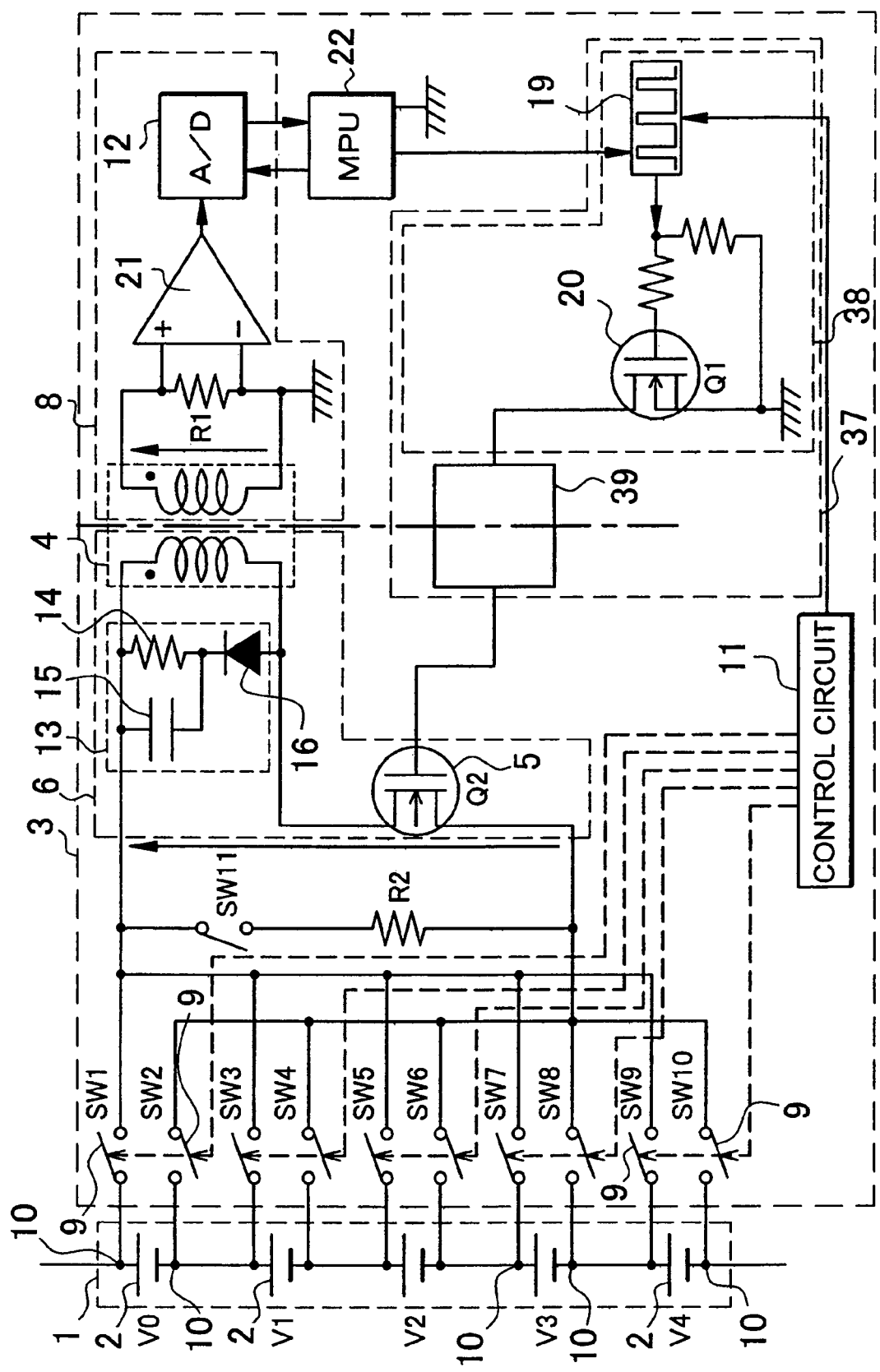
FIG. 3 is a circuit diagram of the car power source apparatus of another embodiment of the present invention.

In the isolated input circuit 7 of the voltage detection circuit 3 shown in FIG. 1, the switching device 5 is switched ON and OFF and the switching device 5 and the pulse circuit 18 are isolated via the input transformer 17. However, as shown in FIG. 3, the isolated input circuit can also use a photo-coupler 39 instead of an input transformer. In the photo-coupler 39 of FIG. 3, the light emitting diode (LED) of the primary side is connected to the output side of the pulse circuit 38, and the photo-sensor of the secondary side is connected to the input side of the switching device 5. In this isolated input circuit 37 as well, the switching device 5 is switched ON and OFF with a given periodicity by the pulse circuit 38 while isolating the switching device 5 and the pulse circuit 38 via the photo-coupler 39.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-173672 filed in Japan on Jun. 23, 2006, the content of which is incorporated herein by reference.

What is claimed is:

1. A car power source apparatus comprising:
    a battery array having a plurality of series connected batteries; and
    a voltage detection circuit to detect the voltage of the batteries that make up the battery array;
    wherein the voltage detection circuit is provided with:
 an isolation transformer having its primary side connected to battery connection nodes;
    a switching device connected in series with the primary side of the isolation transformer;
    an isolated input circuit that switches the switching device ON and OFF with a given periodicity; and
    a secondary voltage detection section that detects output voltage from the secondary side of the isolation transformer when the switching device is switched ON and OFF by the isolated input circuit; and in the battery voltage detection circuit, the primary side of the isolation transformer and switching device series input circuit is electrically connected to a pair of measurement nodes at the battery for voltage detection, the isolated input circuit switches the switching device ON and OFF with a given periodicity to output a voltage at the isolation transformer secondary side corresponding to the primary side input voltage, and the secondary side output voltage is detected by the secondary voltage detection section to determine the voltage at one pair of measurement nodes in the battery array.

2. A car power source apparatus as recited in claim 1 wherein the voltage detection circuit detects the voltage of each battery.

3. A car power source apparatus as recited in claim 1 wherein the voltage detection circuit detects the total voltage of the battery array.

4. A car power source apparatus as recited in claim 1 wherein the frequency at which the switching device is switched ON and OFF is 20KHz to 1 MHz.

5. A car power source apparatus as recited in claim 1 wherein the primary side of the isolation transformer is connected via input switches to the connection nodes of a plurality of batteries.

6. A car power source apparatus as recited in claim 2 wherein input switches sequentially connect both ends of each battery as measurement nodes to the series input circuit to detect the voltage of each battery.

7. A car power source apparatus as recited in claim 5 wherein input switches are connected to the primary side of the isolation transformer and switching device series input circuit.

8. A car power source apparatus as recited in claim 1 wherein a ringing prevention circuit, which is a parallel connection of a resistor and capacitor in series with a diode, is connected in parallel with the primary side of the isolation transformer.

9. A car power source apparatus as recited in claim 1 wherein the switching device is a semiconductor switch.

10. A car power source apparatus as recited in claim 1 wherein the isolated input circuit is provided with an input transformer having its secondary side connected to the input side of the switching device, and a pulse circuit that inputs an ON-OFF pulse of given periodicity to the primary side of the input transformer; and wherein the pulse circuit inputs an ON-OFF pulse to the primary side of the input transformer to switch the switching device connected to the secondary side ON and OFF with a given periodicity.

11. A car power source apparatus as recited in claim 1 wherein the secondary voltage detection section has an A/D converter that converts output voltage to a digital signal synchronous with the ON and OFF period of the switching device.

12. A car power source apparatus as recited in claim 11 wherein the A/D converter detects voltage during timing intervals between points where the switching device switches from OFF to ON and from ON to OFF.

* * * * *